United States Patent [19]

Neumiller

[11] Patent Number: 5,354,540
[45] Date of Patent: Oct. 11, 1994

[54] CATALYTIC REDUCTION OF VOLATILE ORGANIC CONTAMINANTS IN INDOOR AIR

[75] Inventor: Phillip J. Neumiller, Racine, Wis.

[73] Assignee: S. C. Johnson & Son, Inc., Racine, Wis.

[21] Appl. No.: 80,400

[22] Filed: Jun. 21, 1993

Related U.S. Application Data

[63] Continuation of Ser. No. 765,608, Sep. 25, 1991.

[51] Int. Cl.$^5$ .............................................. B01D 53/00
[52] U.S. Cl. .................... 422/174; 55/385.2; 422/122; 422/180
[58] Field of Search ............... 422/120, 122, 125, 173, 422/174, 177, 180, 199, 211, 222; 55/385.2, 385.4, 410, 419, 477, 523, 524

[56] References Cited

U.S. PATENT DOCUMENTS

| 2,940,835 | 6/1960 | Scofield | 422/180 |
|---|---|---|---|
| 3,299,620 | 1/1967 | Hollingworth | 55/126 |
| 3,948,445 | 4/1976 | Andeweg | 422/125 |
| 4,080,174 | 3/1978 | Fremont et al. | 422/173 |
| 4,138,220 | 2/1979 | Davies et al. | 422/173 |
| 4,212,852 | 7/1980 | Aibe et al. | 422/4 |
| 4,331,693 | 5/1982 | Wojciechowski et al. | 422/4 |
| 4,551,304 | 11/1985 | Hölter et al. | 422/122 |
| 4,948,567 | 8/1990 | Atarashiya | 422/122 |
| 4,976,929 | 12/1990 | Cornelison et al. | 422/174 |
| 5,008,091 | 4/1991 | Bassi et al. | 422/173 |
| 5,078,971 | 1/1992 | Matuda et al. | 422/122 |

FOREIGN PATENT DOCUMENTS

| 151552 | 11/1979 | Japan | 422/122 |
|---|---|---|---|
| 3068419 | 3/1991 | Japan | 422/122 |

OTHER PUBLICATIONS

Balston, Inc., 1991 Advertisement for Zero Air Generator Model 75-83 Published Aug. 16, 1991.

Primary Examiner—Robert J. Warden
Assistant Examiner—Robert Carpenter

[57] ABSTRACT

A convection-based device having no moving parts, which effectively catalytically removes volatile organic compounds from an ambient airspace. The device has, located within a vented housing, a catalytic structure designed to allow air to pass through it. The catalytic structure is heated by electric current and maintained to a predetermined temperature. Air enters the bottom of the device, passes through the catalytic structure, where the volatile organic compounds in the air are reduced, and exits the top of the device.

8 Claims, 6 Drawing Sheets

CATALYTIC REDUCTION OF VOLATILE ORGANIC CONTAMINANTS IN INDOOR AIR

This is a continuation of copending application Ser. No. 07/765,608 filed on Sep. 25, 1991.

TECHNICAL FIELD

This invention relates to the field of air purification, and particularly to a simplified device for catalytically removing volatile organic compounds from an ambient air space.

BACKGROUND ART

Air pollution is an issue that has been discussed for many years. Pollutants in the air have been proved to affect human comfort and health. Originally, most air pollution concern was focussed on such factors as automobile and factory stack emissions. Relatively recently, it has been found that the quality of the air inside a home or business is frequently worse than the quality of the air outside that very same home or business. The problem has been termed the Sick Building syndrome, and it has been proved that many of the symptoms of this syndrome are caused by volatile organic compounds (hereafter VOC) in the ambient air within the building.

This concern with indoor air pollution has passed from the realm of scholarly study into the area of publications intended for the general public. The Environmental Protection Agency published "The Inside Story: A Guide to Indoor Air Quality" in 1988. This booklet discusses, among other things, the health effects caused by indoor air pollutants. The pollutants discussed include various VOCs, especially formaldehyde, as well as particulates.

Any recognized problem breeds potential solutions, and many devices for reduction of air pollution have been developed. The simplest such devices draw the air through some sort of filtration device. Air purification devices to remove particulate materials such as dust and smoke particles from the ambient air particles are well known. Examples are the various versions of small units intended to remove cigarette smoke from the air. Electrostatic precipitation devices produce basically the same results without the need for filter replacement. However, such devices can do little to remove VOCs from the air.

The next step in sophistication are devices that, often in conjunction with a filtration or electrostatic precipitation system, incorporate an adsorptive material such as activated charcoal. The adsorptive material aids in the removal of volatile organic compounds from the air.

One rather multifunctional and complex device includes many air purification approaches: filtering systems including an electrostatic one, adsorbent materials, washing systems, germicidal and heating elements, as well as fans to move air through the device. This device, patented as "Gas Treatment Device", U.S. Pat. No. 3,299,620, to C. E. Hollingworth, is intended to process large volumes of air, either indoors or outdoors.

A device employing a catalyst to purify an air stream is disclosed in U.S. Pat. No. 5,008,091, to Bassi et al., "Method for Purifying Air." This method involves preheating the air and passing it through a catalytic bed which is made up of a combination of platinized heat-conductive pellets and metal turnings. This bed is to be maintained at a temperature between 160° C. and 300° C. Low molecular weight hydrocarbons in the air-stream are oxidized during passage through the catalytic bed. An intended use of the device is to remove ethylene from fruit storage chambers, since ethylene is known to hasten the ripening process and is therefore undesirable.

U.S. Pat. No. 4,138,220 to Davies et al., "Apparatus for Catalytic Oxidation of Grease and Fats in Low Temperature Fumes", discloses an apparatus intended to remove odors and other hydrocarbons such as grease, fats and oils from the air stream emitted form a restaurant's cooking operations. A preferred catalytic system utilizes a honey-comb substrate of refractory material coated with a platinum containing catalyst.

The apparatus has a fan which draws air into the essentially cylindrical structure. Inside the structure are baffles and heat exchangers, as well as the catalytic system. An auxiliary heater heats the incoming air stream, which then passes through the catalytic system, where the hydrocarbons are oxidized. Warmer, processed air is directed back from the combustion zone into a heat exchange zone, where it seems to heat incoming air and reduce the need for auxiliary heat. The temperature of the air moving into the combustion chamber is thermostatically controlled and the combustion zone kept at a temperature of 357° F. to 475° F. (181° C. to 246° C.).

U.S. Pat. No. 4,948,567 to Atarashiya, "Deodorizer For Refrigerators Or The Like", discloses a device which has a deodorizing component comprising an adsorbent material (such as activated charcoal or silica) layer and a catalyzer (such as platinum or nickel) layer. The device has heating means which serve to regenerate the adsorbent material. The catalyzer layer is formed on one side of the adsorbent material by dipping the adsorbent layer in the catalyzer solution.

Most currently available air purification devices are thus of either limited utility (the pure filtration systems) or are fairly complicated and are therefore subject to mechanical malfunctions and relatively expensive to produce and thus to purchase.

As discussed before, most residential air purification devices on the market are filtration systems, sometimes incorporating adsorption systems, electrostatic precipitators and negative ion generators.

Ironically, the electronic air cleaners and negative ion generators used in an attempt to purify indoor air themselves produce ozone, since they are high voltage devices (see *Indoor Air Pollution* by Thad Godish, Lewis Publishers, 1989, at p. 280), and excess ozone is well known to have adverse health effects on humans—urban areas, especially in hot and humid weather, publish ozone alerts recommending limiting outdoor activity. Thus, a simple, relatively inexpensive device with a minimum number of components capable of removing volatile organic compounds from an ambient air space and destroying ozone is highly desirable.

SUMMARY DISCLOSURE OF INVENTION

The present invention provides a simplified catalytic air purification device (CAP hereafter), neither having nor needing any moving parts and operational at low temperatures for the removal of volatile organic compounds from an ambient air space. Volatile organic compounds and ozone are removed from the air when the air passes through a structure coated with a catalyst, which catalytically oxidizes the compounds. The structure is preferably in the form of a honeycomb and is heated by an electric heating element. Electric energy is supplied to the heating element through a simple circuit, which connects on the one end to the heating element and on the other end to a pair of male prongs designed to be inserted into a standard electric plug. The circuit includes a diode to provide pulsed DC current to the heating coil, a one time thermal circuit breaker to protect the device from thermal overloads, a neon indicator light, and a thermostat to maintain the device at the desired temperature.

Air enters through vents in the bottom of the housing of the device, and passes through the heated catalyst structure. The volatile organic compounds in the airstream are catalytically oxidized, primarily to water and carbon dioxide, during the passage. The now heated air exits the device through vents in the top of the housing of the device. As the heated air leaves the device, cooler ambient air is drawn by convection into the vents in the bottom of the device.

BEST MODE FOR CARRYING OUT THE INVENTION

Throughout the figures, like reference numerals are used to refer to like parts.

Figure 1:
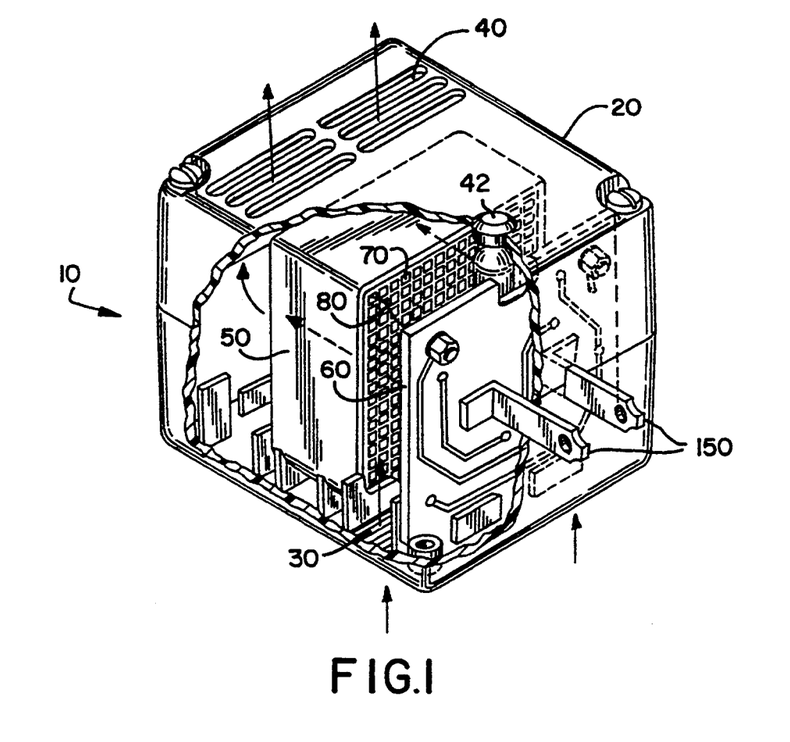
FIG. 1 is a perspective drawing of the device, with the housing made transparent and partially cut away so that the internal structures of the device are visible.

FIG. 1 shows device 10 which has housing 20 which has two sets of air inlet ports—air inlets ports 30 and air outlet ports 40. Situated upon housing 20 is indicator light cover 42. Located within housing 20 is catalyst containing structure 50 and circuit board 60.

Suitable catalysts are those based in whole or in part on platinum, palladium, or platinum-aluminum oxide. Catalyst containing structure 50 is a catalytic composition located upon a substrate, the catalytic composition being capable of converting volatile organic compounds to, primarily, reduction products such as carbon dioxide and water, at a temperature within the range of 80° C. to 150° C.

Catalyst containing structure 50 is, in the preferred embodiment of the invention, a monolithic ceramic honeycomb structure having a series of air passages 70 running therethrough, which is coated with a platinum catalyst. This catalytic structure, which is available from Allied Signal (PZM 13647), has a cordierite substrate (composed of silicon and aluminum dioxides and magnesium oxide). This substrate is impregnated with a catalytic solution composed of aluminum oxides and platinum. This catalyst functions at lower temperatures than other existing catalysts, preferably in the range of 90° C. to 140° C. and optionally, in the present invention in the range of 90° C. to 110° C. (The catalyst also functions at temperatures above this range, but since it effectively reduces most organic compounds present at low concentrations in the air at 100° C., higher temperatures are not necessary.)

VOCs, whether they be odor producing or health-affecting, are typically present in the home environment at relatively low concentrations, on the order of a few parts per million. It is in this environment that the CAP of the present invention is intended to be used and it has proved to be very effective under such conditions. To remove high levels of VOCs (on the order of thousands of parts per million), such as might be found in manufacturing facilities, would require the catalyst to be maintained at a higher temperature, perhaps on the order of 200° C. The CAP could be operated at such temperatures, but it would be necessary to provide additional shielding for safety's sake.

Figure 2:
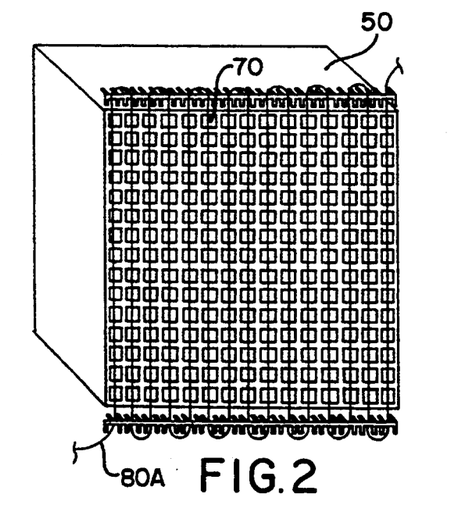
FIG. 2 is a perspective view of one embodiment of the heating element of the device.
Figure 3:
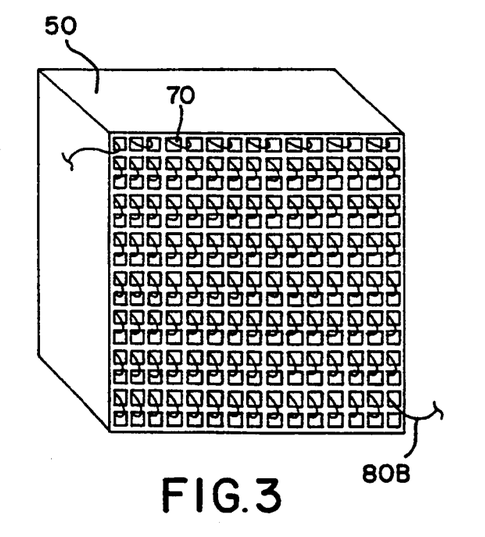
FIG. 3 is a perspective view of a second embodiment of the heating element of the device.

Catalyst containing structure 50 is heated to operating temperature by heating element 80, as shown in FIGS. 2 and 3. Heating element 80 is preferably made of 36 gauge Nichrome ™ wire (an alloy containing 60% Nickel, 24% Iron, 16% Chromium, and 0.1% Carbon, available from Kanthal, Inc.), although other heating elements such as positive temperature coefficient heaters may also be used.

FIG. 2 shows one possible configuration of heating element 80, 80A, in which the Nichrome wire is looped back and forth over one surface of catalyst containing structure 50. FIG. 3 shows the preferred configuration of heating element 80, 80B, in which the Nichrome wire is woven back and forth through each of the air passages 70 of the catalyst containing structure 50.

In either configuration of heating element 80, catalyst containing structure 50 must be heated to the predetermined temperature for effective operation. The predetermined temperature for the preferred embodiment with the Allied Signal catalyst has been found to be between 90° C. and 110° C. and preferably approximately 100° C. Other catalyst containing structures may be used in the device but the operating parameters of the device may need to be changed to do so.

Figure 4:
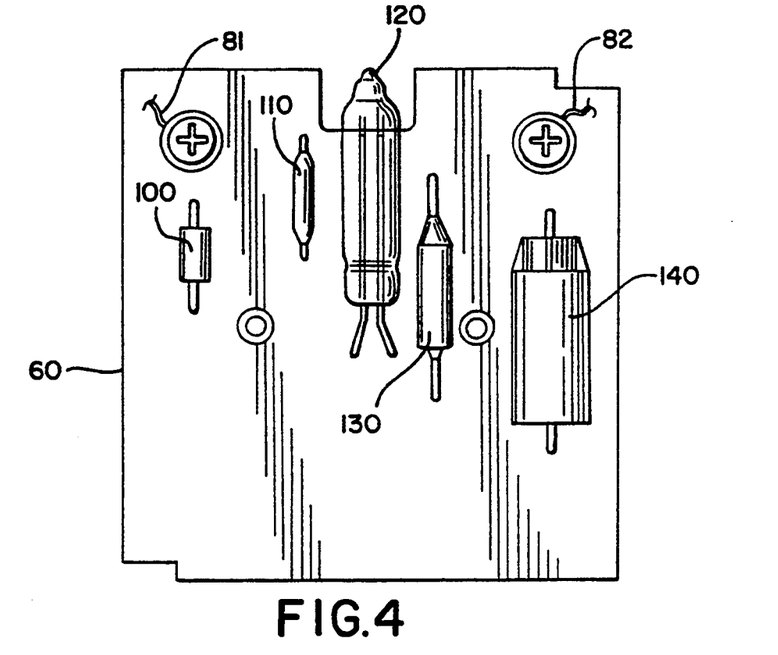
FIG. 4 shows one side of the circuit bearing control board of the device.
Figure 5:
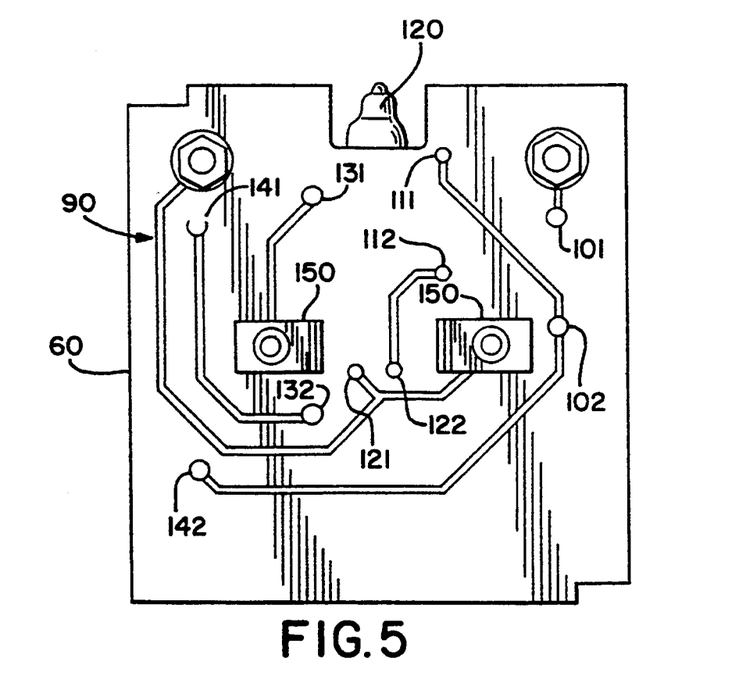
FIG. 5 shows the second side of the circuit bearing control board of the device.

Connected to heating element 80 at circuit connections 81 and 82 (shown in FIG. 4) is operating circuit 90 (shown in FIG. 5) which is located upon circuit board 60. As shown in FIG. 4, operating circuit 90 is made up of diode 100, resistor 110, indicator light 120, thermal circuit breaker 130, and thermostat 140. As shown in FIGS. 4 and 5, diode 100 connects to operating circuit 90 at diode connections 101 and 102; indicator light 120, at light connections 121 and 122; thermal circuit breaker 130 at breaker connections 131 and 132; and thermostat 140 at thermostat connections 141 and 142. Operating circuit 90 is also connected to male plugs 150, which are configured so as to fit into a normal wall socket and therefore connect with a source of AC electricity.

When male plugs 150 are inserted into a wall socket, current flows to device 10. Diode 100, preferably a 400 PIV, 2 amp unit transforms AC current flowing through male plugs 150 into pulsed DC current. Resistor 10, preferably a 150 kΩ provides a voltage drop from the pulsed current so that neon indicator light 120, preferably an NE2, can operate. Neon indicator light 120 serves to tell the user of device 10 when current is flowing to the device, for the light which when on is visible to the user through indicator light cover 42, is only on so long as current flows through its circuit.

Thermal circuit breaker 130 preferably from MicroTemp ™ protects the device from being overheated, for a thermal overload will burn out the fuse within the breaker and prevent further current flow. The predetermined desired temperature catalyst containing structure 50 is set and maintained by thermostat 140.

When device 10 is plugged into a wall socket and catalyst containing structure 50 has reached the desired temperature device 10 is fully operational and operating. (It should be understood that device 10 will function at temperatures below the desired temperature and it has even been found that there is some catalytic reduction of volatile organic compounds at room temperature.)

Air contained within housing 20 is heated by now heated heating element 80 and, being heated, rises and exits housing 20 through air outlet ports 40.

Ambient (unheated) air enters housing 20 through air inlet ports 30 to replace the now departed heated air. As can be seen in FIG. 1, air entering air inlet ports 30 enters the device on one side of catalyst containing structure 50 and must (and does) therefore pass, through air passages 70 in order to exit device 10 through air outlet ports 40. (Arrows on FIG. 1 depict the direction of air flow.) Thus, airflow through device 10 is maintained by convection and no moving parts such as fans are necessary for its operation.

The fact the device has no moving parts makes it simpler (and cheaper) to make and minimizes malfunctions. However, since no fan forces air through the catalyst containing structure, the device would not be effective unless a reasonable rate of airflow were somehow maintained.

As discussed before, most air purifying devices available have either some sort of blower system to force air through the system or work with air that is already moving in a stream. Obviously, some means of propelling air through a purification device is necessary for the device to function effectively.

The present device creates the necessary passthrough airflow by a chimney or stack effect created by the heating element and the configuration of the device itself. While the device was designed and dimensioned to provide an optimum stack effect, it was found that the air flow through the functioning device exceeded expectations. The expected theoretical draft through a 38.1 mm.×38.1 mm. (1.5"×1.5") structure heated to 100° C. and enclosed in a housing in the shape of a cube 69.85 mm. (2.75") per side (dimensions of preferred embodiment used in tests described below) would be expected to be 0.04 cfm. The observed flow was calculated to be approximately a half cubic foot per minute, based on the timed results of the tests.

Obviously, a fan or other air moving device could be incorporated into the present device, and, especially for environments in which higher operating temperatures are desirable, as described above, such additional air flow aids may prove desirable.

The simplicity of the present invention device translates into lower costs of production.

FUNCTIONAL TESTING

The device of the present invention has been tested and has proved to effectively destroy volatile organic components in an ambient airspace.

In controlled chamber testing with a 200 ft.$^3$ sealed chamber, background levels of contamination were established by VOC monitoring before the device was activated. The device was then activated and a controlled quantity of the target contaminant was injected into the chamber and its level was monitored, again by VOC monitoring, over time.

Figure 6:
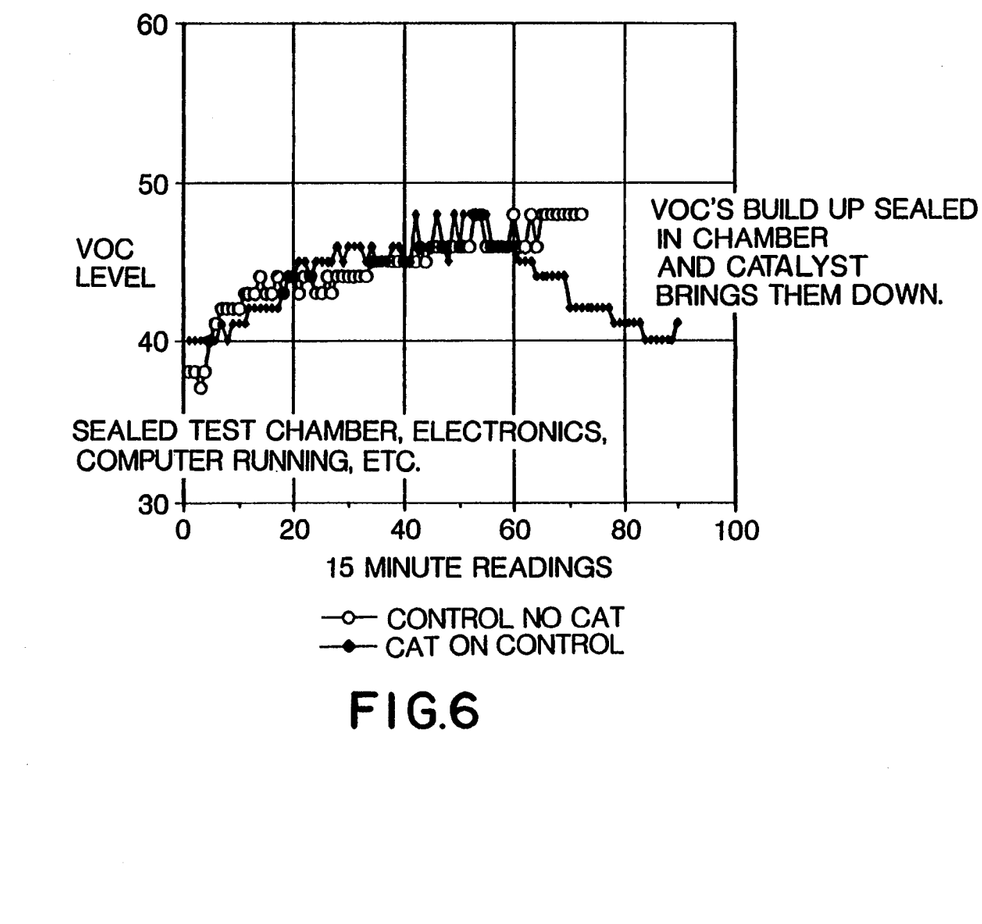
FIG. 6 is a chart showing the relative reduction of VOC's in a chamber with and without the CAP.
Figure 7:
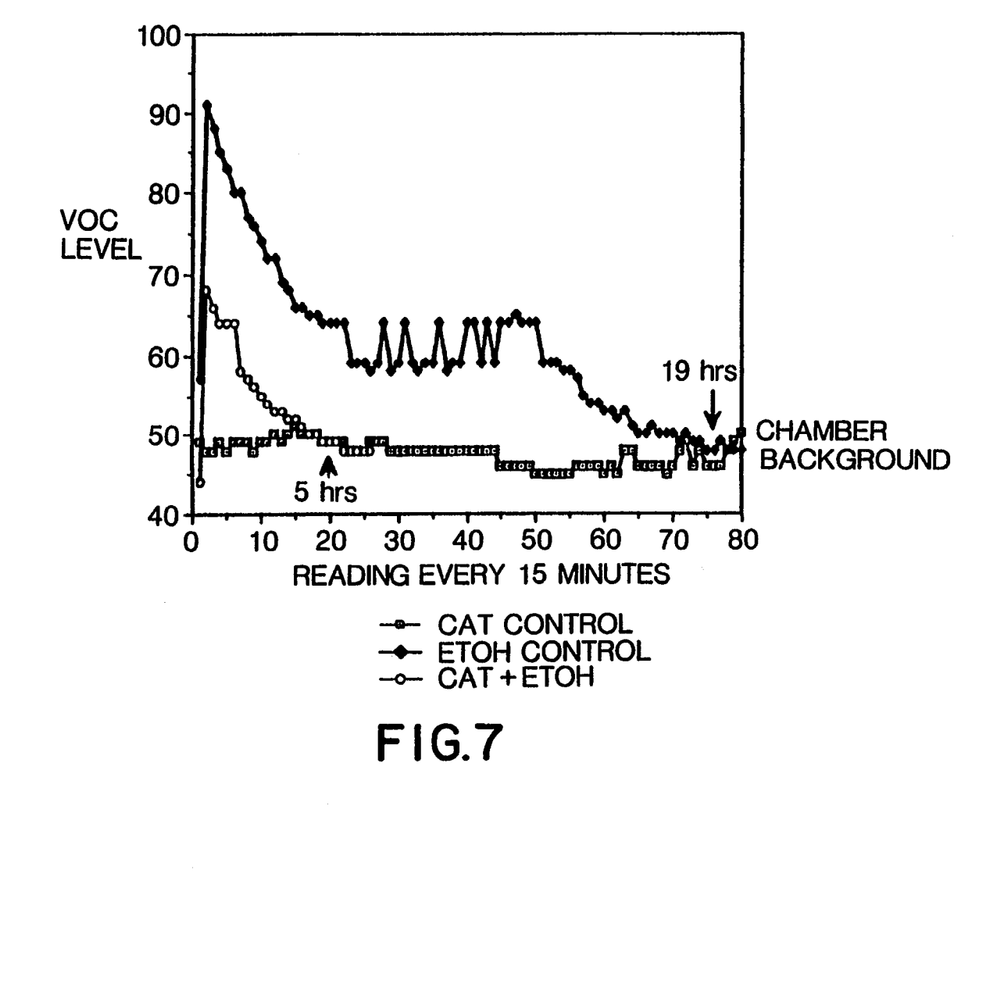
FIG. 7 is a chart showing the reduction of ethanol in a chamber with and without the CAP.
Figure 8:
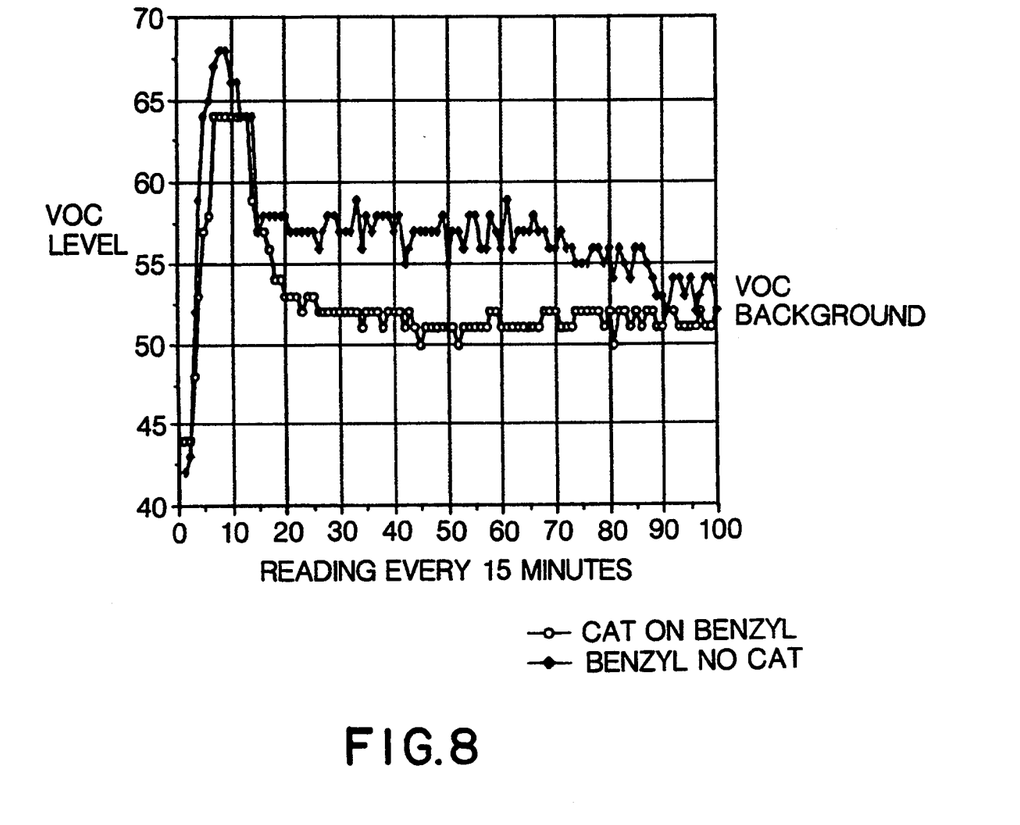
FIG. 8 is a chart showing the reduction of benzyl acetate in a chamber with and without the CAP.

The results of this chamber testing are shown in FIGS. 6, 7 and 8. FIG. 6 shows the control background behavior and demonstrates that VOC levels in an ambient airspace will build up simply because of the existence of electronic equipment. In this experiment, no specific VOCs were injected into the chamber—only the overall levels were measured. Obviously, the build up would be even more dramatic if solvents, etc., were being utilized. In the tests shown in this FIG., electronic equipment was placed into the sealed chamber. As can be seen, the VOC level built up over time. VOC levels continued to rise when no catalytic device was placed in the chamber. However, when the catalytic air purification device was placed into the chamber and activated, VOC level was brought down over time.

FIGS. 7 and 8 show the results, which are similar, of controlled injection of VOCs into the chamber. FIG. 7 shows the results of the injection of 20 mg. ethanol into the chamber. In the absence of the CAP, the concentration of ethanol in the chamber would, after almost 20 hours, return to the background VOC level of the chamber. However, when a CAP was functioning within the chamber, ethanol levels would return to background levels within five hours.

FIG. 8 shows results after injection of 40 mg. of a benzyl acetate. With a functioning CAP, benzyl acetate levels in the chamber approached background levels in approximately 30 minutes. In the absence of a CAP, the benzyl acetate took almost an hour and a half to dissipate.

Figure 9:
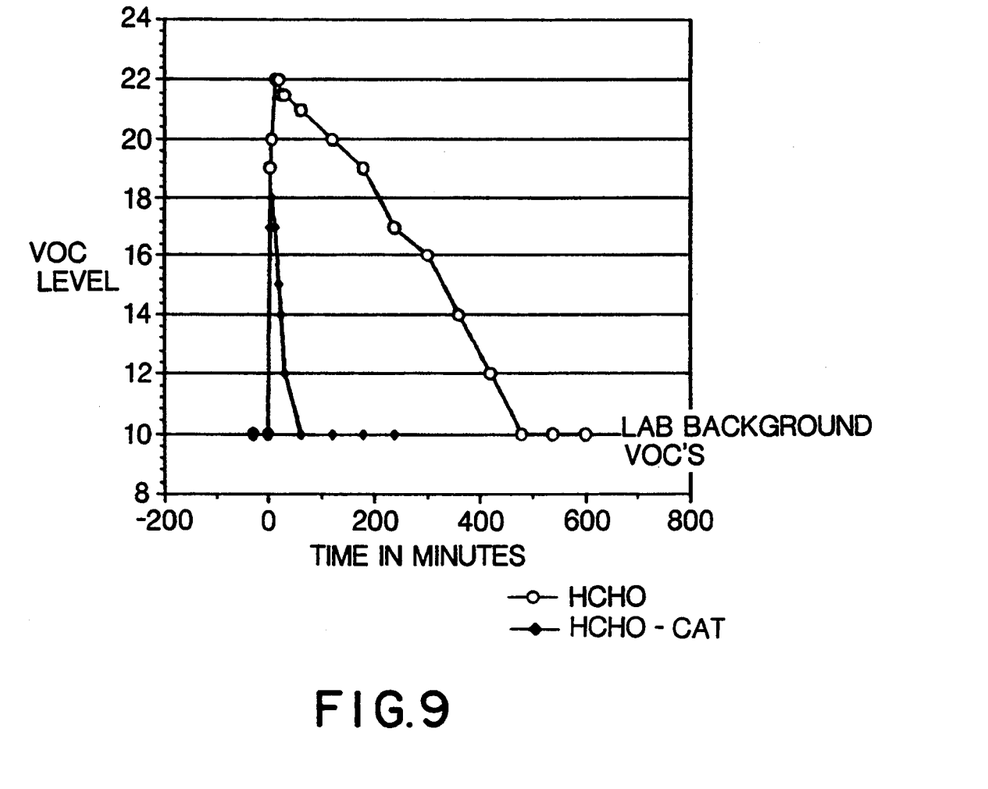
FIG. 9 is a chart showing the reduction of formaldehyde in a bell jar with and without the CAP.

FIG. 9 shows similar results after the injection of 1 mg. of formaldehyde into a bell jar holding 10 liters of air. With a functioning CAP in the chamber, formaldehyde levels reached background levels in approximately an hour. In the absence of a CAP, the formaldehyde took almost eight hours to dissipate.

While no ozone reduction tests were performed with the CAP itself, testing performed by the manufacturer of the preferred catalyst with a similar platinum on alumina catalyst showed an effective conversion of ozone to oxygen of better than 90% at 100° C. Thus, the CAP should prove effective at removal of ozone as well as VOCs from ambient air.

Other modifications of the catalytic VOC removal device of the present invention will become apparent to those skilled in the art from an examination of the above patent Specification and drawings. Therefore, other variations of the present invention may be made which fall within the scope of the following claims even though such variations were not specifically discussed above.

Industrial Applicability

The CAP of the present invention can be placed in any area where it is desirable to lower the levels of VOCs in the ambient airspace. Since VOCs include both compounds that are injurious to human health and compounds that have unpleasant odors, the unit would be useful in home workshops, kitchens, and bathrooms, as well as other living areas, and in motel and nursing home rooms as well as homes. Units larger than the units fabricated and tested could be designed following the teaching and claims of the present invention to be effective in treating larger volumes of air or higher concentrations of VOCs.

What I claim is:

1. A convection-based catalytic air purification device for removing volatile organic compounds from ambient room air in a living space at atmospheric pressure, said device consisting essentially of:

a ventilated housing having a top side and a bottom side, the ventilated housing having at least one ambient room air inlet port formed within and through the bottom side, and at least one ambient room air outlet port formed within and through the top side and an airflow passage connecting the air inlet port and the air outlet port, a catalyst containing structure, located upon a substrate within the ventilated housing in the airflow passage, having an air inlet side and an air outlet side and a plurality of structural air passages running between the air inlet and air outlet sides such that all ambient room air entering the at least one air inlet port must pass through the catalyst containing structure before the air exits the at least one air outlet port at atmospheric pressure, the catalyst containing structure comprising a catalytic composition that will convert volatile organic compounds to reduction products such as carbon dioxide and water, at a temperature between 80° C. and 150° C., means for heating the catalyst containing structure to and maintaining it at a temperature of between 80° C. and 150° C. to effectively convert volatile organic compounds to reduction products in ambient room air flowing by convection through the airflow passage of the ventilated housing, and means for connecting the heating means to an energizing means external to the device, the device being designed and configured so that airflow through the device is maintained solely by convection of ambient room air in a living space at atmospheric pressure.

2. A device for removing volatile organic compounds from an ambient air space according to claim wherein the catalyst containing structure is a honeycomb structure formed of ceramic material, and the catalytic composition coated upon the substrate of the ceramic honeycomb structure contains, as the active ingredient, a compound selected from the group consisting of platinum and platinum compounds.

3. A device for removing volatile organic compounds from an ambient air space according to claim 1 wherein the means for heating the catalyst containing structure comprises a control circuit having connected, by conductive material and in serial sequence, a diode, a resistor, an indicator light, a thermal circuit breaker, and a thermostat, the control circuit being connected at each end to a heating wire located adjacent to one or more surfaces of the catalyst containing structure.

4. A device for removing volatile organic compounds from an ambient air space according to claim 3 wherein the heating wire is made from Nichrome wire.

5. A device for removing volatile organic compounds from an ambient air space according to claim 1 wherein the means for connecting the heating means to the energizing means external to the device is a pair of male plugs conductively connected to the control circuit which can be inserted into an electric socket.

6. A device for removing volatile organic compounds from an ambient air space according to claim 1 wherein the means for heating maintains the catalyst containing structure at a temperature of between 90° C. and 140° C.

7. A device for removing volatile organic compounds from an ambient air space according to claim 1 wherein the means for heating maintains the catalyst containing structure at a temperature of between 90° C. and 120° C.

8. A device for removing volatile organic compounds from an ambient space according to claim 1 wherein the means for heating the catalyst containing structure comprises a positive temperature coefficient heater unit.

* * * * *

UNITED STATES PATENT AND TRADEMARK OFFICE
CERTIFICATE OF CORRECTION

PATENT NO. : 5,354,540

DATED : October 11, 1994

INVENTOR(S) : Neumiller, Phillip J.

It is certified that error appears in the above-identified patent and that said Letters Patent is hereby corrected as shown below:

In column 8, line 2, the numeral 1 should be added after the word claim.

Signed and Sealed this

Thirteenth Day of February, 1996

Attest:

BRUCE LEHMAN

*Attesting Officer*   Commissioner of Patents and Trademarks